United States Patent [19]

Horlacher

[11] Patent Number: 5,365,774
[45] Date of Patent: Nov. 22, 1994

[54] METHOD OF AND APPARATUS FOR TESTING THE SEAL OF FILLED CONTAINERS

[75] Inventor: Willy Horlacher, Vellberg, Germany

[73] Assignee: Gasti Verpackungsmaschinen GmbH, Schwabisch-Hall, Germany

[21] Appl. No.: 118,449

[22] Filed: Sep. 8, 1993

[30] Foreign Application Priority Data

Sep. 10, 1992 [DE] Germany .............. 4230025

[51] Int. Cl.$^5$ .................... G01M 3/36; G01M 3/34
[52] U.S. Cl. .................... 73/49.3; 73/45.4; 73/52
[58] Field of Search ............ 73/49.3, 45.4, 52

[56] References Cited

U.S. PATENT DOCUMENTS

| | | | |
|---|---|---|---|
| 2,924,093 | 2/1960 | Hurst | 73/45.4 |
| 4,188,819 | 2/1980 | Egee et al. | |
| 4,663,964 | 5/1987 | Croce | 73/49.3 |
| 4,709,578 | 12/1987 | Iwasaki et al. | 73/49.3 |
| 4,715,215 | 12/1987 | Perhach et al. | 73/49.3 |
| 4,887,457 | 12/1989 | Humbarger | 73/49.3 |
| 4,899,574 | 2/1990 | Potteiger | |
| 4,901,558 | 2/1990 | Leining et al. | 73/49.3 |
| 4,934,180 | 6/1990 | Hulsman | 73/49.3 |
| 5,033,287 | 7/1991 | Watanabe et al. | 73/52 |
| 5,105,654 | 4/1992 | Maruyama et al. | 73/49.3 |
| 5,111,684 | 5/1992 | Stauffer et al. | 73/49.3 |
| 5,156,329 | 10/1992 | Farrell | 229/125.35 |
| 5,239,859 | 8/1993 | Lehmann | 73/49.2 |

FOREIGN PATENT DOCUMENTS

| | | |
|---|---|---|
| 0355699 | 2/1990 | European Pat. Off. |
| 0459335 | 12/1991 | European Pat. Off. |
| 8128651 | 3/1983 | Germany |
| 3528248 | 7/1985 | Germany |
| 3718600 | 3/1987 | Germany |
| 3725739 | 4/1987 | Germany |

Primary Examiner—Hezron E. Williams
Assistant Examiner—J. David Wiggins
Attorney, Agent, or Firm—Herbert Dubno

[57] ABSTRACT

A method of and apparatus for the testing of containers, preferably in a filling closing machine for comestible products in plastic cups or the like. The container is received in a vacuum bell or chamber which is equipped with a suction cup at the end of a suction pipe above the cover so that, when the chamber is evacuated, the cover can bulge to block the suction cup and a pressure differential developed between the suction pipe and the chamber signalling an effective seal. In the case of an ineffective seal, damage to the cover or the like, the pressure difference does not develop and the defective package can be sorted out.

17 Claims, 3 Drawing Sheets

METHOD OF AND APPARATUS FOR TESTING THE SEAL OF FILLED CONTAINERS

FIELD OF THE INVENTION

My present invention relates to a method of and an apparatus for testing the seal of filled containers which can be closed with a cover or the like, affixed by an adhesive seal or welded onto the container. More particularly the invention relates to the testing of the tightness of a cover applied to a container where a cushion at atmospheric pressure following closing of the container lies between the cover and the product packaged in the container, usually a comestible or foodstuff. Specifically the invention relates to a testing of the tightness of the cover which utilizes the bulging effect of the cushion of air within the container upon subjecting the container to subatmospheric pressure, also referred to as vacuum or suction herein, so that the degree of the bulge of the cover represents the tightness of the seal of the container.

BACKGROUND OF THE INVENTION

When a cover or the like, e.g. a lid, foil seal or the like, is not seated correctly on the container, or the traces of product which are packaged is left between the surfaces of the cover or container to be sealed together, by a pressed-fit seal, an adhesive seal or a weld, e.g. an ultrasonic or heat-seal weld, the defective seal can result in spoilage of the contents of the container. This also applies to cases in which the rim of the container or the cover may be damaged, either on manufacture or in the container filling and closing process.

In all such cases, the filled container cannot be closed hermetically or in an air-tight manner so that the spoilage can occur. The danger is especially prominent in cases in which the product filled into the container is a comestible or foodstuff, for example, a dairy product like yogurt, cottage cheese or the like, where absolutely tight seals are essential if the product is not to become rapidly unusable.

As a consequence, systems have been developed for testing the tightness of the seal of such packages, generally in association with a filling and container-closing line or machine.

In German open application DE-OS 37 25 739, the tightness of the seal of plastic cups containing a packaged product and having a cover welded onto the cup can be tested by utilizing the bulge of the cover as a criterium. The bulge of the cover is electronically measured and the electronic measurement is evaluated by a computer.

When the cup is subjected to a subatmospheric pressure, the bulge of the cover develops a maximum which can be measured, the measurement digitalized and the digital signal subtracted in the computer from a reference value, the difference being compared with a specific preselected magnitude. A voltage change on a contactless analog displacement measuring sensor thus can be used to signal the state of the tested product. In the case of a container which is not sufficiently sealed or tight, the signal results in a sorting out of the defective container downstream of the testing station. This testing method requires, as a consequence of the electronic sensors used, costly apparatus.

U.S. Pat. No. 4,934,180 discloses a seal testing unit which seals a pressure chamber against the container and allows a pressure medium to be introduced into the annular pressure chamber so that the pressure medium can penetrate into possible openings in the weld seam between the cover and the container to cause the cover to bulge outwardly. A signal is triggered by this bulge.

Instead of introducing a fluid under pressure to the container, a subatmospheric pressure can be applied, and in this case the cover will remain in a lower position. In either technique the lack of tightness of the container is established and the defective container can be sorted out. This system utilizes a mechanical sensing of the displacement of the cover which follows the cover and requires a certain stability of the shape of the cover.

Another drawback of this arrangement is that it allows only the sealing zone of the cover and container to be tested and does not respond to a defect in the cover itself except at the sealing zone.

German open application DE-OS 37 18 600 discloses a method of and an apparatus for determining the tightness of filled containers having a cover or the like sealed or welded thereto by squeezing the container together to impart a bulge to the cover in the case of a sealed container. The height of the bulge is measured as an indication of the tightness of the cover utilizing a contact sensor.

Apart from the fact that this system is sensitive to the characteristics and shape stability of the container and/or its cover, whereby different heights of the bulge can be generated with different degrees of application of the squeezing forces, this system also creates the possibility that the container will be excessively squeezed and damaged even if the seal was originally sufficient. Furthermore, repeated adjustment of the sensor is required with this arrangement.

German Patent 35 28 248 discloses a method of and an apparatus for monitoring the tightness of filled containers in which between the cover or the like and the product filled into the container, an air or gas cushion is provided.

This gas cushion is heated from above the cover and the cover is pressed downwardly by mechanical means. The position of the cover is detected and from this position it is determined whether the cover or the seal is intact or defective. This system operates satisfactorily but requires exact matching to the cover used. It is also important that the heating heat not damage any imprint provided on the cover or distort the cover thermally. Furthermore, for different materials from which the cover is made, efforts must be taken to ensure as uniform a thermal conductivity as is possible.

OBJECT OF THE INVENTION

It is, therefore, the principal object of the present invention to provide a process for monitoring the tightness of a sealed or welded cover or the like closing a container, especially a plastic container, whereby drawbacks of earlier systems are avoided.

It is also an object of the invention to provide a method for the purposes described which is independent of the shape stability of the cover and can be universally used on filling and closing machinery.

A further object of this invention is to provide an improved apparatus for testing the seal of a closed container of a packaged product such that the failure of the cover or of the seal or weld can be readily determined with precision and collateral effects on the detection are largely eliminated.

SUMMARY OF THE INVENTION

According to the invention, within the vacuum bell or chamber above the cover of the container, a vacuum line or pipe which opens to evacuate the chamber is provided with a mouthpiece which is automatically closed by the bulge on the cover in the case of a properly sealed container. With a container which has lost its tightness or sealing effect, the mouth of the vacuum line remains unclosed and in both cases a pressure difference between the pressure within the vacuum bell or chamber and the applied pressure at the vacuum line is determined.

More particularly, the method of the invention can comprise:
(a) introducing the container into a vacuum chamber evacuatable through a vacuum line opening into the chamber from above;
(b) evacuating the chamber at least above the cover through the vacuum line, thereby enabling pressure within the container to bulge the cover upwardly to an extent representing sealing tightness of the cover on the container;
(c) upon upward bulging of the cover, automatically blocking with the cover a mouth of the vacuum line and thereby signalling by the blocking of the mouth of the vacuum line a satisfactory seal, an unsatisfactory seal preventing the cover from bulging sufficiently to block the mouth; and
(d) measuring a pressure difference between a pressure P2 generated in the chamber by evacuation through the vacuum line and a pressure P3 applied by the vacuum line to the chamber.

In apparatus terms, the system for carrying out the method of the invention can comprise:
means forming a vacuum chamber evacuatable through a vacuum line opening into the chamber from above;
means for evacuating the chamber at least above the cover through the vacuum line, thereby enabling pressure within the container to bulge the cover upwardly to an extent representing sealing tightness of the cover on the container, the vacuum line having a mouth positioned, upon upward bulging of the cover, to be automatically blocked by the cover to thereby signal by the blocking of the mouth of the vacuum line a satisfactory seal, an unsatisfactory seal preventing the cover from bulging sufficiently to block the mouth; and
means for measuring a pressure difference between a pressure P2 generated in the chamber by evacuation through the vacuum line and a pressure P3 applied by the vacuum line to the chamber.

With the system of the invention, substantially all lids or covers, independently of their thermal conductivity, or their shape stability, can be tested for tightness. An undesired thermal loading of the cover cannot be effected. The measurement results are more reliable than those with earlier systems. The invention can be used with hot filling of the container since additional heating of the cover to generate a bulge is not required.

In addition, a color coding or application of an expiration date can be applied to the cover prior to seal testing without the danger that the imprint will be damaged.

The pressure difference measurement according to the invention can be an individual one for each container, or a multiple measurement simultaneously for a multiplicity of containers disposed inside the vacuum bell or chamber. The testing can be carried out in a container-filling and closing machine or, if desired, even downstream of the container-filling and closing machine, even after introduction of the containers into a box, tray or other carrier.

The apparatus can include in addition to the vacuum chamber into which one or more closed containers can be inserted, a vacuum pump connected to the vacuum line and means for signalling the detection of sealed and unsealed containers. At a predetermined but adjustable distance above the cover or the like of on each container, a mouthpiece of a suction pipe is provided. The interior of the vacuum bell or chamber can be connected by a measuring line with one side of the pressure difference measuring device, whose other side communicates via a branch line with the vacuum or suction pipe of the vacuum pump. A testing station of this kind can have a relatively simple construction and can be universally provided in filling machines and the like since the automatic closure of the mouthpiece can be ensured for different covers without modifications.

It has also been found to be advantageous to form the mouthpiece with a suction cup and to locate it downwardly centrally to the cover or the like of on a respective container.

Each suction cup can be provided at the lower end of a vacuum pipe and the vacuum pipes can be connected to the vacuum line of a vacuum pump.

For matching apparatus to different height containers or different covers having different shape stability, the distance between the lower edge of the suction cup and the upper side of the cover or the like of each container can be adjustable. This can be achieved simply by providing the suction pipe in a cover of adjustable height within the vacuum bell.

By the bulging or, in the case of unsealed containers, the lack of bulging, pressure differences can be determined which easily discriminate the unsealed container from a sealed container.

Monitoring the test process is facilitated by making at least part of the wall of the container from a transparent material, e.g. glass. Preferably the wall of the chamber or vacuum bell is formed by a glass cylinder or the like.

To improve the reliability of the measurement in the case of small leaks under conditions of rapid evacuation, the vacuum bell is connected with a three-way valve interposed between the suction pipe and the suction source and the three-way valve is connected to a bypass running to the chamber or vacuum bell. Above the cover in the chamber is a held-down sleeve which can be spring-biased downwardly and can be lifted by a pneumatic cylinder or other lifting device.

When the vacuum bell is integrated into a container-filling and closing machine as part of a pressure-difference control measuring unit, the vacuum bell can be subdivided and a closure part can engage around the container from beneath the conveyor of the filling machine to press upwardly against the conveyor. At the top of the conveyor, a portion of the bell can engage over the cover of the container, the two parts forming an evacuatable chamber.

The parts can move substantially vertically to open and close around the container so that determination of the sealing effectiveness can be carried out along the container path through the filling and closing machine.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
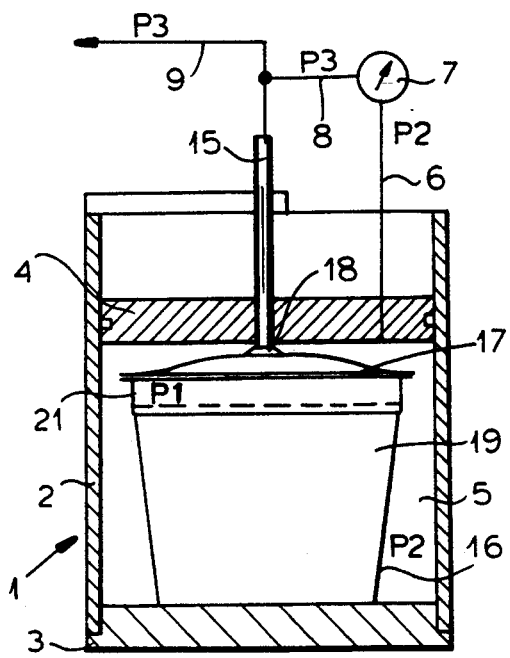
FIG. 1 is a schematic cross sectional view showing the testing of the seal of a container and the pressure difference measurement with a properly sealed container.

The seal testing device shown in FIG. 1 comprises a vacuum bell or chamber 1 which can comprise a glass cylinder defining the peripheral wall of the evacuatable space 5 and through which the container to be tested is visible. This wall is sealed to a bottom 3 and receives a cover plate 4 which has a seal against the wall 2 and is vertically shiftable within the glass cylinder.

In the space 5 between the bottom 3 and the cover plate 4 in which a container 16 to be tested is received, a measuring tube 6 opens.

Figure 3:
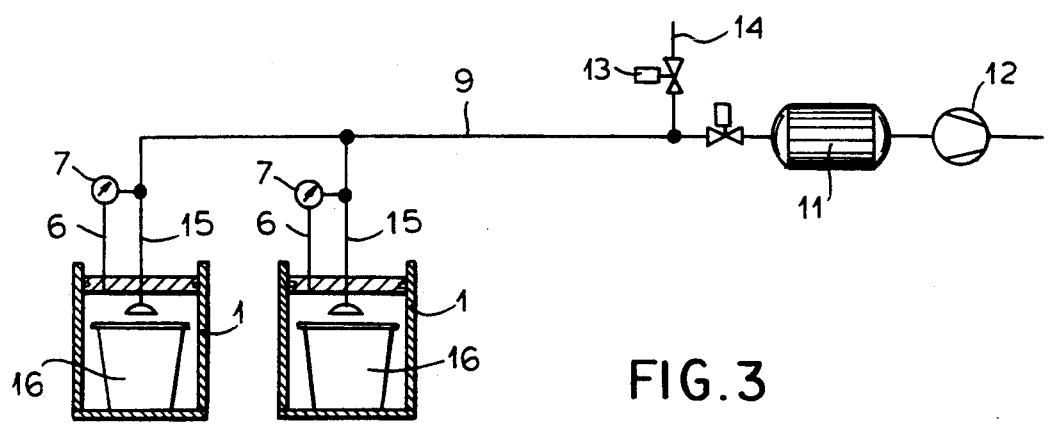
FIG. 3 is a partial cross sectional view and partial flow diagram illustrating an apparatus according to the invention in which individual containers are received in individual chambers.
Figure 4:
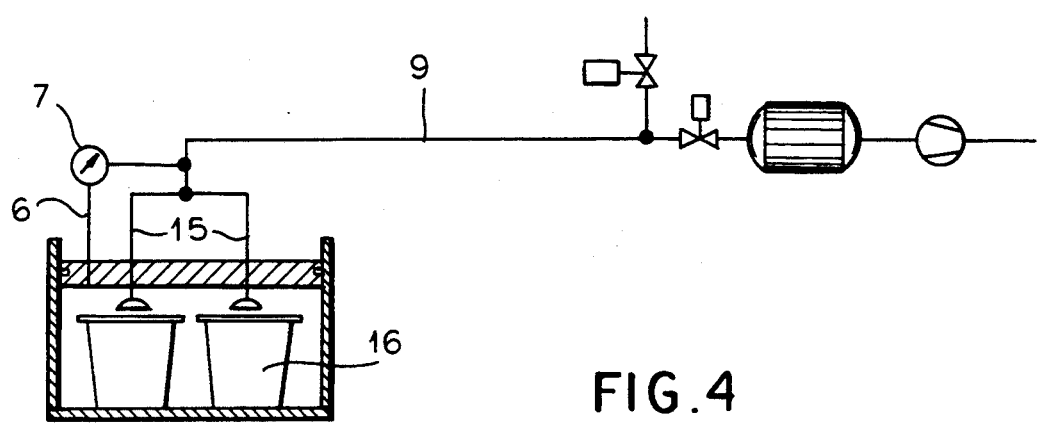
FIG. 4 is a view similar to FIG. 3 showing an embodiment of the invention in which a plurality of containers are tested in a single vacuum bell.

The opposite end of the measuring tube 6 is connected to a pressure difference measuring unit 7 which is also connected via a branch line 8 with a vacuum line 9 in turn connected to a vacuum pump 12 and a vacuum accumulator 11 as has been shown in greater detail in FIGS. 3 and 4.

A valve 13 enables venting or pressure relief of the vacuum line 9 and is connected to a venting line 14.

Figure 2:
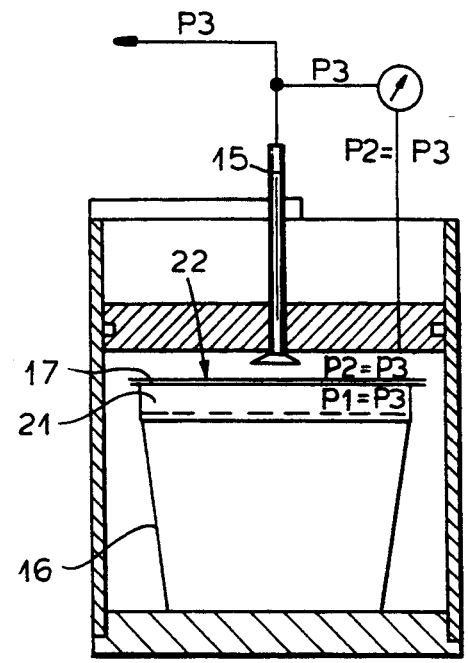
FIG. 2 is a view similar to FIG. 1 showing the case of a container having a defective seal.

In the region of the vacuum bell 1, the vacuum line 9 is connected to a suction pipe 15 (FIGS. 1 and 2) which is disposed substantially centrally of the space 5 and with respect to the container 16 to be tested. The latter can, for example, be a plastic cup containing a foodstuff or other product and is, for example, closed by a cover 17 composed of an aluminum foil.

At its end turned toward the cover 17 of container 16, the suction pipe 15 is formed with a mouthpiece 18 which, in the embodiment shown, is a suction cup.

The underside of the suction cup 18 can be adjustable in height with respect to the upper side of the cover 17.

Above the product 19 filled into the container 16 and reaching to the underside of the cover 17, is an air-filled head space 21 which, under normal conditions (i.e. in the case of a sealed container at atmospheric pressure), which is also at atmospheric pressure P1. The testing for seal failure of the container 16 is effective to detect a poorly seated cover, the inclusion of some of the product in the seal or weld seam between the cover and the container, poorly operating sealing equipment for forming the seal, or damaged, distorted and nonsealing portions of the cover itself.

Upon evacuation of the vacuum bell 1 via the vacuum line 9 and the suction pipe 15 with its suction cup 18, the atmospheric pressure P1 within the head space 21 of the container is applied against the cover 17 and, to the extent that the weld seam 20 is tight, the cover 17 will bulge outwardly.

After a relatively brief period of time, the cover will bulge sufficiently to press against the suction cup 18 of suction pipe 15. Upon contact of the cover with the suction cup, the suction cup sucks past against the cover 17 and thus prevents further evacuation of the interior space of the vacuum bell 1. There is within the interior space 5 of the vacuum bell 1 a certain pressure P2.

This pressure P2 is applied by the measuring line 6 to the pressure difference measuring unit 7 which is also supplied via a branch line 18 with the subatmospheric pressure P3 prevailing in the suction pipe 9 and in the suction pipe 15. At the pressure difference measuring unit 7 a predetermined pressure difference P2 minus P3 is outputted. This applies where the container is sealed tightly.

To the extent that the container is incompletely sealed and whether because the cover has holes or because the weld seam or seal seam is defective, the following situation prevails. Upon evacuation of the vacuum bell 1, air flows from the head space 21 of the container 16 through the unsealed locations, for example 22, into the interior 5 of the vacuum bell.

The air in the interior space 5 of the vacuum bell 1 is thus evacuated via the suction pipe 15.

The air flowing from the head space 21 of the container does not generate any bulge in the cover 17. Without such a bulge of the cover, the suction cup is not blocked by the cover and no pressure difference can arise. This means that the pressure P1 in the head space 21 and the pressure P2 in the interior 5 of the chamber correspond to the applied subatmospheric pressure P3. This indicates that the container is not tightly sealed.

FIG. 3 shows the principles of the invention as applied to measurement of the pressure difference for individual tests on individual containers. In this case, two or more containers 16 can be received in separate vacuum bells. Each vacuum bell or chamber is provided with a respective suction pipe 15 and a measuring line 6 with the pressure difference measuring unit 7.

The suction lines can be connected to the same subatmospheric pressure source.

In FIG. 4 a multiple testing system is shown in which, in a single chamber, a plurality of containers 16 can be provided alongside one another. The two suction pipes 15 here can be connected to a common vacuum line. In this case only a single measuring line 6 and a single pressure difference measuring device 7 are provided. This unit is simple and inexpensive, especially since it uses only one control device. The container thus can be received in a chamber whose volume need only be slightly greater than the collective volume of the containers received therein.

Figure 4A:
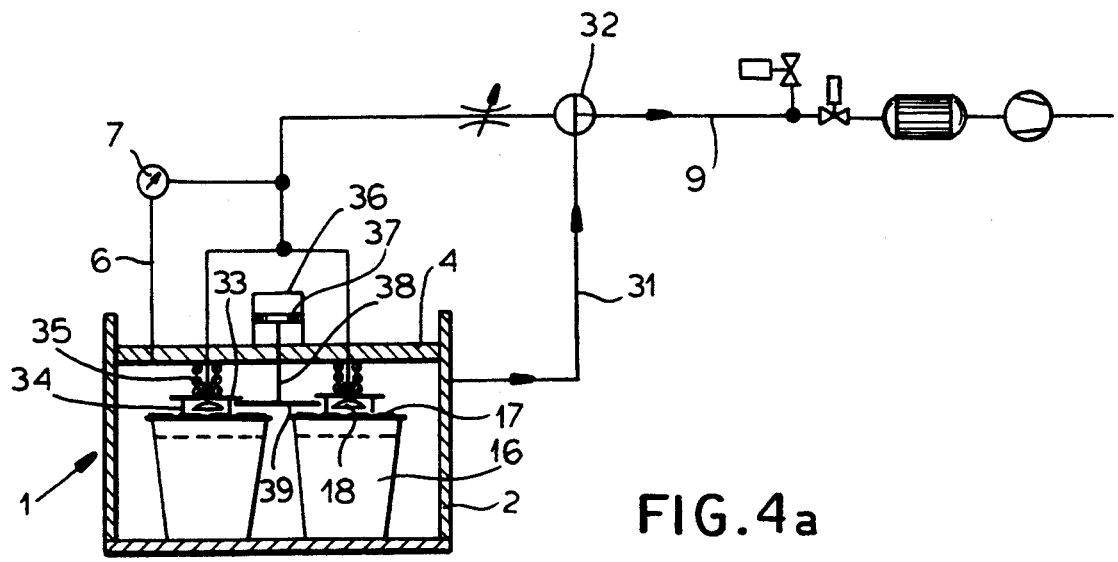
FIG. 4a and 4b are diagrams illustrating alternative embodiments of the apparatus shown in FIG. 4.
Figure 4B:
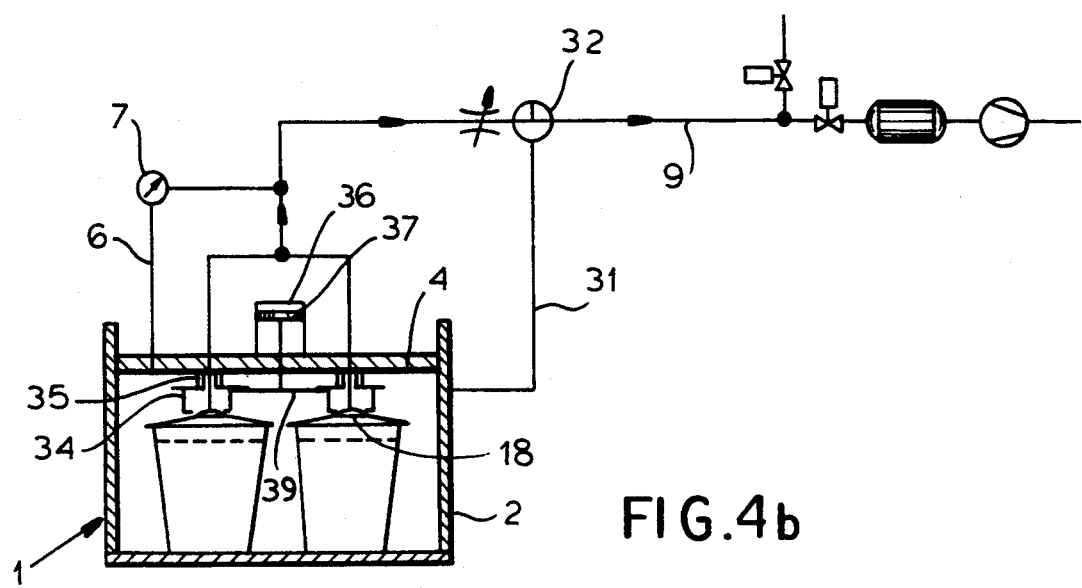

FIGS. 4a and 4b show alternative apparatus for the multiple container monitoring.

To the wall 2 of the vacuum bell 1, a bypass line 31 is connected. The bypass line 31 is tied to a three-way valve 32 and via this valve with a vacuum line 9.

Within the vacuum bell 1, above the cover 17 of each container 16, an annular bushing 34 with a collar 33 is provided.

A compression spring 35 on the underside of the cover plate 34 is braced against the bushing 34. Above the cover plate 4 a pneumatic cylinder 36 is arranged and has a piston 37 connected to a piston rod 38 which can engage under the collars 33 of the sleeves or bushings 34 as a lifting plate 39.

In the first phase of the evacuating process, the largest part of the volume to be evacuated is sucked off via the bypass line 31.

The annular bushing 34 which is spring-biased against the cover 17 prevents the cover from prematurely bulging when the bypass line 31 rapidly evacuates the chamber.

In the second phase, the three-way valve 32 switches the pneumatic cylinder 36, i.e. bypass 31 is blocked, the annular bushing 34 is lifted free and the suction cup 18 is free. The residue of the evacuating volume is sucked off via the suction cup 18.

When the container is tight, the cover 17 assists in the lifting of the bushing 34 by a bulging and enables a pressure difference to develop.

If the container is not tight, the residual volume is drawn off through the suction cup. This residue is not able to form a bulge, i.e. no pressure difference develops.

Figure 5:
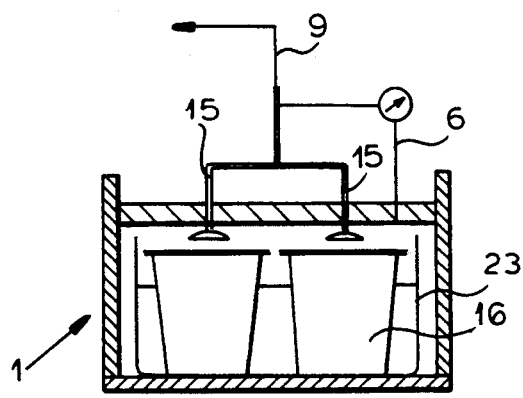
FIG. 5 is a cross sectional view showing the testing apparatus for containers in a carton or on a tray.

A multiple test can be effected as shown in FIG. 5 after the containers have been introduced into a carton 23, a tray or the like.

All of the containers within the carton or tray can be simultaneously tested.

Figure 6:
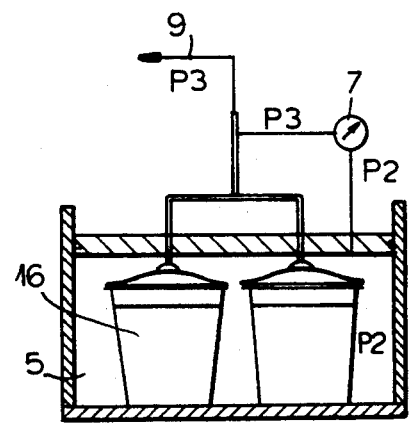
FIG. 6 is a cross sectional view through an apparatus in which the pressure difference measurement is effected simultaneously on two containers.
Figure 7:
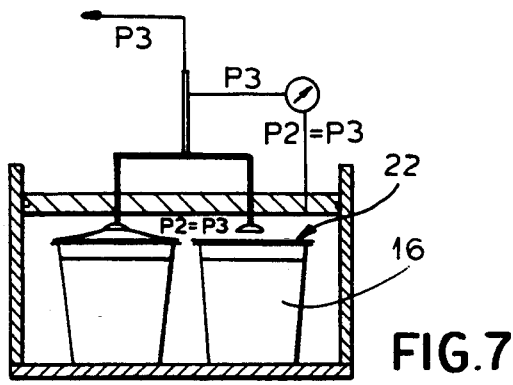
FIG. 7 is a view similar to FIG. 6 showing the case for one sealed and one unsealed container.

The testing of a plurality of containers with a single testing unit can be effected utilizing the apparatus shown in FIGS. 6 and 7. FIG. 6 shows the case in which two side by side containers are tightly sealed in this case, after an evacuation of the interior 5 of the chamber, both covers 17 press against the underside of the suction cups 18 and in this case a pressure difference is developed which shows that none of the containers has a failed seal.

In the case of FIG. 7, the container on the left is tight while the container on the right is not tight. In this case, the pressure difference is zero. This signals that at least one container among those tested has a failed seal. The container experiencing the seal failure can be visibly determined by viewing the containers through the transparent wall of the vacuum bell and easily recognized and sorted.

Basically it is also possible and under certain circumstances advantageous to integrate the dosing unit in a container-filling and closing machine.

Figure 8A:
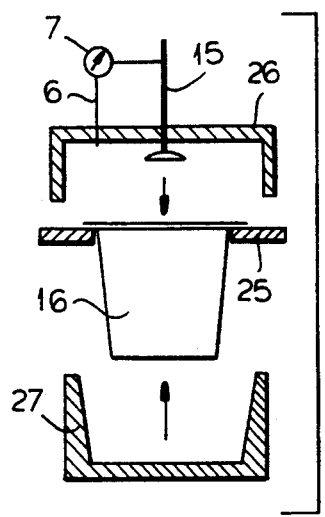
FIGS. 8a, 8b and 8c are cross sectional views showing successive steps in the testing of containers on a conveyor of a filling and sealing machine.
Figure 8B:
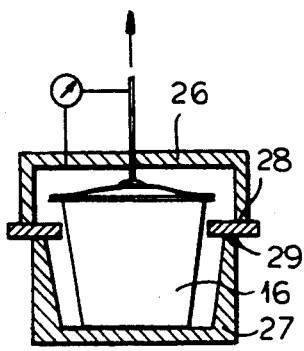
Figure 8C:
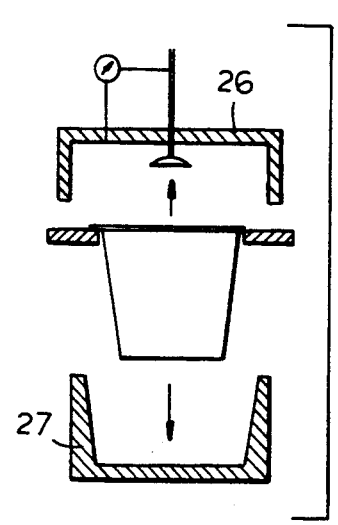

Such an arrangement has been shown in FIGS. 8a, 8b and 8c.

The container 16 may be provided in respective rows on a conveyor 25 which carries the containers through the machine in a stepwise manner for viewing with the product, closing of the covers and sealing.

At a station the individual containers or containers in groups across the conveyor belt can be tested in a vacuum bell or a plurality of vacuum bells, the vacuum bell being bipartite.

The apparatus for each vacuum bell has a first part 26 along the upper side of the conveyor belt 25 and a second part 27 disposed along the lower part of the conveyor belt, the two parts being movable toward one another as represented by the arrows in FIG. 8a so that they can close on a container 16 while the edges of these parts at 28 and 29 seal against the conveyer belt 25. The upper part carries the suction pipe 15 and its suction cup.

In the closed position, FIG. 8b, the chamber can be evacuated through the suction cup and suction pipe to cause the cover to bulge upwardly and block the suction cup thereby producing the pressure difference in the manner described which signals an effective seal. After the test, the parts 26 and 27 can be moved away form one another (arrows in FIG. 8c) to allow the conveyor to advance and another container brought into the test position. As has been described previously, the failed seal will prevent the cover from bulging and will not give rise to a measurable pressure difference. That failure can be registered and, where the containers are to be packaged in cartons or the like, the defective container can be discarded.

The invention is not limited to the embodiments described but can include any variation within the spirit and scope of the appended claims. The vacuum bells can travel synchronously with the conveyor so that the latter need not operate intermittently if it is desired to carry out the test over a certain stretch of the transport path. The vacuum bells can be returned to their starting positions to receive the containers of the next row.

I claim:

1. A method of testing the seal tightness of a cover sealed to a container closed by the cover and having an air space originally under atmospheric pressure P1 between contents of the container and the cover, said method comprising the steps of:
   (a) introducing said container into a vacuum chamber evacuatable through a vacuum line opening into said chamber from above;
   (b) evacuating said chamber at least above said cover through said vacuum line, thereby enabling pressure within said container to bulge said cover upwardly to an extent representing sealing tightness of the cover on the container;
   (c) upon upward bulging of said cover, automatically blocking with said cover a mouth of said vacuum line and thereby signalling by the blocking of the mouth of the vacuum line a satisfactory seal, an unsatisfactory seal preventing said cover from bulging sufficiently to block said mouth; and
   (d) measuring a pressure difference between a pressure P2 generated in said chamber by evacuation through said vacuum line and a pressure P3 applied by said vacuum line to said chamber.

2. The method defined in claim 1 wherein said container is one of a succession of containers from a filling machine, said containers being individually introduced into said chamber for determining respective seal tightness.

3. The method defined in claim 1 wherein said container is one of a succession of containers from a filling machine, said containers being inserted in groups into said chamber with respective covers of said containers each being juxtaposed with a mouth of a respective suction pipe connected to said vacuum line and evacuating said chamber.

4. The method defined in claim 3 wherein said containers are provided on a carrier for all of the containers of the group and said containers are inserted in said chamber with said carrier.

5. The apparatus defined in claim 1 wherein said chamber is at least partly transparent so that said container is visible therein.

6. The apparatus defined in claim 5 wherein said chamber is formed by a glass cylinder.

7. An apparatus for testing the seal tightness of a cover sealed to a container closed by the cover and having an air space originally under atmospheric pressure P1 between contents of the container and the cover, said apparatus comprising:

means forming a vacuum chamber evacuatable through a vacuum line opening into said chamber from above;

means for evacuating said chamber at least above said cover through said vacuum line, thereby enabling pressure within said container to bulge said cover upwardly to an extent representing sealing tightness of the cover on the container, said vacuum line having a mouth positioned, upon upward bulging of said cover, to be automatically blocked by said cover to thereby signal by the blocking of the mouth of the vacuum line a satisfactory seal, an unsatisfactory seal preventing said cover from bulging sufficiently to block said mouth; and means for measuring a pressure difference between a pressure P2 generated in said chamber by evacuation through said vacuum line and a pressure P3 applied by said vacuum line to said chamber.

8. The apparatus defined in claim 7 wherein:

said mouth is formed by a mouthpiece of said vacuum line disposed at a predetermined distance above said cover prior to evacuation of said chamber;

said vacuum line is connected to a vacuum pump; and said means for measuring is a pressure-difference measuring device connected by one measuring duct to said chamber and another measuring duct to a branch of said vacuum line.

9. The apparatus defined in claim 8 wherein said mouthpiece is a suction cup.

10. The apparatus defined in claim 9 wherein said suction cup is oriented centrally with respect to said cover.

11. The apparatus defined in claim 10 wherein said suction cup is disposed at an end of a suction pipe forming part of said vacuum line.

12. The apparatus defined in claim 9, further comprising means for adjusting a distance between a lower of said suction cup and an upper side of said cover of said container.

13. The apparatus defined in claim 11 wherein said suction pipe is supported in a cover plate sealingly guided and height adjustable in said chamber.

14. The apparatus defined in claim 9 wherein said chamber is formed as part of a pressure-difference control measuring unit integrated in a container filling and closing machine.

15. The apparatus defined in claim 14 wherein said machine has a conveyor receiving a succession of said containers, said suction pipe being mounted on a suction bell on one side of said conveyor and alignable with a container on said conveyor at a seal testing station of said machine, and a closure part engageable against said conveyor on an opposite side thereof around said container with which said suction bell is aligned so as to form said chamber with said suction bell.

16. The apparatus defined in claim 15 wherein said suction bell and said closure part are movable vertically toward and away from said conveyor in a closing and an opening movement, respectively.

17. The apparatus defined in claim 9 wherein said vacuum line is provided with a three-way valve between said suction pipe and a suction source, said three-way valve having a bypass connected to said chamber, said apparatus further comprising a hold-down sleeve mounted in said chamber and surrounding said mouthpiece and said suction pipe, spring means biasing said hold-down sleeve downwardly into engagement with said cover of a container in said chamber, and a pneumatic cylinder connected to said hold-down sleeve for lifting said hold-down sleeve against force of said spring means from said cover.

* * * * *